United States Patent [19]

Paar

[11] 4,431,781
[45] Feb. 14, 1984

[54] PAINT BINDERS INCLUDING EPOXY RESINS MODIFIED TO CONTAIN OXAZOLIDINE GROUPS AND PROCESS FOR PRODUCING SAME

[75] Inventor: Willibald Paar, Graz, Austria

[73] Assignee: Vianova Kunstharz, A.G., Werndorf, Austria

[21] Appl. No.: 433,984

[22] Filed: Oct. 12, 1982

[30] Foreign Application Priority Data

Oct. 12, 1981 [AT] Austria ................................ 4364/81
Sep. 1, 1982 [AT] Austria ................................ 3273/82

[51] Int. Cl.³ .............................................. C08G 59/64
[52] U.S. Cl. .................................... 525/502; 523/414; 525/504; 528/111; 528/113; 528/117; 528/361; 528/363; 204/181 C
[58] Field of Search ............... 528/111, 117, 363, 407, 528/113, 361; 525/504, 502; 523/414

[56] References Cited

U.S. PATENT DOCUMENTS 3,822,237  7/1974  Alford .............................. 528/111 X
4,327,200  4/1982  Leitner et al. .................. 528/114 X
4,366,274 12/1982  Pampouchidis et al. ....... 528/111 X
4,367,319  1/1983  Pampouchidis et al. ....... 528/111 X
4,376,844  3/1983  Emmons ......................... 528/111 X Primary Examiner—Earl A. Nielson
Attorney, Agent, or Firm—A. W. Breiner

[57] ABSTRACT

Paint binders and process of producing same water-soluble upon total or partial neutralization with inorganic or organic acids comprising the reaction product of an epoxy compound having at least two 1,2-epoxy groups with secondary oxazolidine amines and saturated or unsaturated carboxylic acids; said binders having a theoretical amine value of at least 35 mg KOH/g. The paint binders are particularly useful in paints formulated for cathodic deposition. Paints formulated with said binders exhibit good applicational characteristics including throwing power, and the cured films have good mechanical and chemical resistance.

14 Claims, No Drawings

PAINT BINDERS INCLUDING EPOXY RESINS MODIFIED TO CONTAIN OXAZOLIDINE GROUPS AND PROCESS FOR PRODUCING SAME

The present invention is directed to paint binders, water-soluble upon total or partial neutralization with acids, which include epoxy resins modified to contain oxazolidine groups, and to their process of preparation. The binders prepared according to the present invention are particularly well suited for the preparation of paints for use in cathodic deposition.

European Patent Application Nos. 00 28 401 and 00 28 402 disclose binders or cathodic deposition (KETL) which contain as protonizable groups oxazolidine groups. According to these applications, the oxazolidine groups are introduced into hydroxy group containing polymers via monoadducts of an N-hydroxyalkoxazolidine and a diisocyanate or via an ester linkage with dicarboxylic acid semiesters of an N-hydroxyalkyloxazolidine. In EP-PS No. 00 28 402 it is stated that the sole use of oxazolidine groups as the protonizable groups provides the advantage that with a low degree of neutralization solubility in water may be achieved. However, the low basicity of the oxazolidine groups provide only relatively low pH-values. Therefore, the reference suggested the introduction of additional basic groups into the polymer through reaction of a part of the epoxy groups with primary and/or secondary amines or semiesters of dicarboxylic acids.

It has now been found that combinations of oxazolidine groups and amine groups may be introduced into epoxy resins in a simple and sophisticated way by reacting the epoxy resins with secondary amines carrying oxazolidine groups.

The present invention, therefore, is directed to paint binders, water-soluble upon total or partial neutralization with inorganic and/or organic acids, characterized in that the epoxy groups of a resin-like compound having at least two 1,2-epoxy groups per molecule are reacted with one or more secondary amines of the general formula

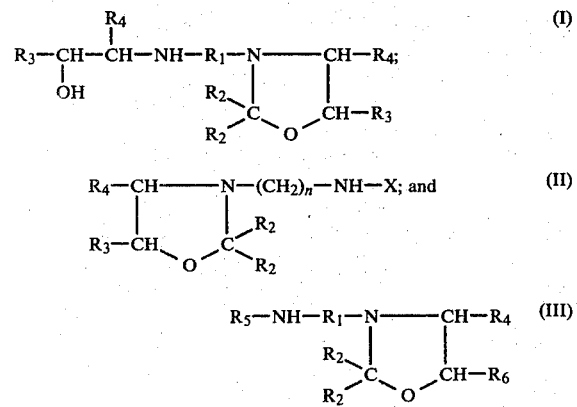

wherein $R_1$ is a straight chain or branched chain or cyclic alkylene radical with from 2 to 12 C-atoms or an aralkylene radical, $R_2$ is a straight chain or branched chain alkyl radical with from 1 to 4 C-atoms or an aryl group or a hydrogen atom, or both $R_2$ groups jointly are ring-forming alkylene radicals optionally substituted with alkyl, aryl, or alkoxy radicals, $R_3$ is a saturated or unsaturated aliphatic or cycloaliphatic or aromatic hydrocarbon radical, optionally carrying ether or ester linkages, $R_4$ is H or $CH_3$—, n is 2–4, X is either

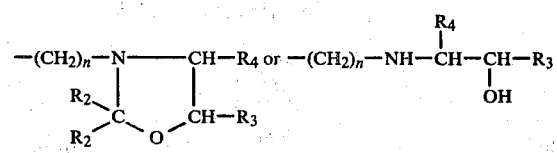

$R_5$ is a radical after reaction with an active hydrogen atom of an acrylic or methacrylic monomer, monofunctional with regard to the double bond, and $R_6$ is a hydrogen atom or an alkyl radical; and with a saturated and/or unsaturated carboxylic acid and, optionally, primary and/or secondary alkyl and/or alkanol amines; the reaction occurring in the presence of inert solvents at from 60° to 80° C., with the quantity of basic compounds being chosen in order that the end product has a theoretical amine value of at least 35 and preferably of from 50 to 140 mg KOH/g. The final binders, that is after reaction of the epoxy resin with the secondary amines carrying oxazolidine groups and the other modified agents, can optionally be subjected to acidic hydrolysis at from 50° to 80° C.

According to the present invention, it is possible to obtain in a simple and controllable manner products which may be used as the sole binder and, owing to their excellent pigment wetting characteristics, also for the production of pigment pastes for subsequent blending to paints for cathodic electrodeposition. The binders of the invention, over the known oxazolidine group carrying binders, provide a simpler and more controllable production process and substantially enhance the possibilities for introducing factors which will favorably influence the final films. Paints formulated with binders of this invention exhibit outstanding applicational characteristics, such as favorable parameters for electrodeposition and throwing power, as well as superior performance of the cured films with regard to mechanical and chemical resistance.

Resin-like compounds with at least two 1,2-epoxy groups for reaction with secondary amines containing oxazolidine groups are the known epoxy resins obtained through reaction of bisphenols, novolaks, glycols, and the like, with epichlorohydrin or methylepichlorohydrin. These products are available on the market in a great variety and are described in detail in literature. The particularly preferred epoxy resins are based on Bisphenol A or on novolaks with an epoxy equivalent weight of between about 170 and 1000.

The secondary amines for reaction with the epoxy resins have the general formula

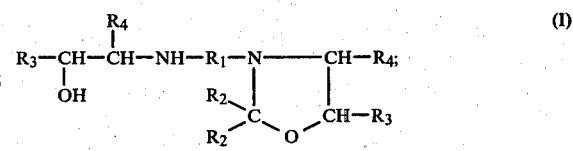

-continued

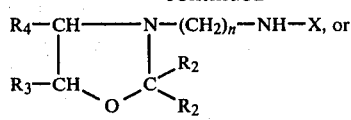

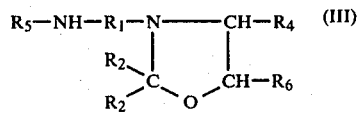

wherein

R₁ is a straight chain or branched chain or cyclic alkylene radical with from 2 to 12 C-atoms or an aralkylene radical, R₂ is a straight chain or branched chain alkyl radical with from 1 to 4 C-atoms or an aryl group or a hydrogen atom, or both R₂ groups jointly are ring-forming alkylene radicals optionally substituted with alkyl, aryl, or alkoxy radicals, R₃ is a saturated or unsaturated aliphatic or cycloaliphatic or aromatic hydrocarbon radical, optionally carrying ether or ester linkages, R₄ is H or CH₃—, n is 2–4, X is either

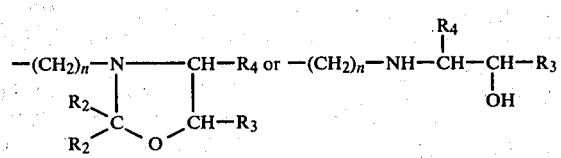

R₅ is a radical after reaction with an active hydrogen atom of an acrylic or methacrylic monomer, monofunctional with regard to the double bond, and R₆ is a hydrogen atom or an alkyl radical.

These amines are low molecular weight compounds which carry one or, optionally, two secondary amine groups as well as at least one substituted oxazolidine ring. The secondary amine groups are reacted at from 60° to 80° C., optionally in the presence of inert organic solvents, with the epoxy groups of the epoxide resin, tertiary amine groups being thereby formed. In order to obtain satisfactory solubility in water, the quantity of all basic components is chosen in order that the end product has a theoretical amine value of at least 35, and preferably of between 50 and 140 mg KOH/g.

The secondary amines of the general formula (I) are obtained through reaction of a primary diamine with two moles of a monoepoxy compound with subsequent ring formation with a carbonyl compound, i.e., an aldehyde or ketone, as exemplified by the following reaction mechanism:

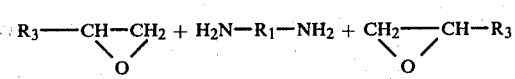

-continued

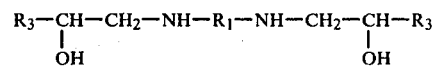

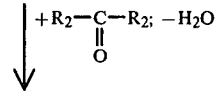

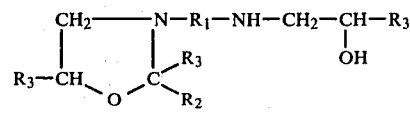

The primary diamines are straight chain or branched alkylene diamines with from 2 to 12 C-atoms, such as ethylene diamine and its straight chain homologues; branched homologues such as neopentyl diamine; cycloaliphatic diamines such as tricyclodecane diamine (=TCD diamine=3(4), 8(9)-bis-(aminomethyl)tricyclo-5.2.1.0²,⁶-decane) or trimethylcyclopentane diamine, or aralkyl diamines such as xylene diamine (C₆H₄(CH₂NH₂)₂). Suitable monoepoxy compounds for reaction with the primary diamine are carboxylic acid glycidyl esters, particularly Cardura ® E (the glycidyl ester of C₉-C₁₁-monocarboxylic acids), or glycidylmethacrylate, glycidylethers such as butyl, phenyl, p-tert.-butylphenol or allylglycidyl ethers, or hydrocarbon oxides such as olefinic oxides

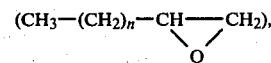

octylene oxide

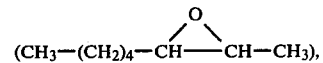

styrene oxide or cyclohexane vinylmonoxide. Through selection of the radical at the glycidyl group, the properties of the final product may be monitored as regards flexibility, hardness, crosslinking density, and the like. Suitable carbonyl compounds which can be utilized for the formation of the oxazolidine ring are aliphatic aldehydes, preferably formaldehyde; aromatic aldehydes such as benzaldehyde, or ketones such as methylisobutyl ketone or cyclohexanone. In the first reaction step one mole of primary amine is reacted with two moles of the monoepoxy compound. In this step the monoepoxy compound is added to the amine at 60° to 120° C. within one hour. The subsequent reaction is conducted at from 70° to 130° C., and normally is finished after three hours. In the second step, the epoxide-amine-adduct is reacted at 80° to 110° C. with the carbonyl compound to form the ring, the reaction water being removed azeotropically with the aid of an entraining agent, for example a hydrocarbon solvent with a boiling range of from 80° to 120° C.

The secondary amines of formula (II) employ as the starting amines dialkylene triamines such as diethylene triamine or 3-(2-aminoethyl)-aminopropylamine. In this case the epoxide-amine-adduct can be reacted with one to two moles of the carbonyl compound to provide amines with one to two oxazolidine rings.

The secondary amines of formula (III) are obtained through reaction of alkylamino-beta-hydroxyamines with an acrylic or methacrylic compound, monofunctional with regard to the double bond, and subsequent ring formation with a carbonyl compound, such as aldehyde or a ketone, according to the following reaction mechanism, the various radicals R having the same meaning as indicated above:

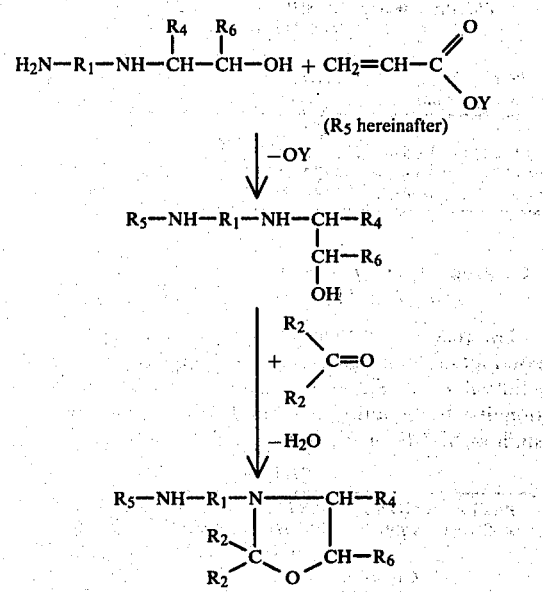

The preferred alkylamino-beta-hydroxyamines are available on the market and are products such as aminoethylethanol amine ($NH_2$—($CH_2$)$_2$—NH—($CH_2$)$_2$—OH), aminopropylethanol amine or aminoethylisopropanolamine. Suitable acrylic or methacrylic monomers, besides homologous esters of acrylic or methacrylic acid with monoalcohols, are monomers carrying tertiary amine groups such as dimethylaminoethylacrylate and its homologues or the homologous hydroxyalkylacrylates. The carbonyl compounds utilized in the formation of the oxazolidine ring are the same as those used in forming the secondary amines of formula (I) above. The preparation of the oxazolidine amines according to formula (III) is effected by slowly adding the acrylic monomer to the amine at 30° to 50° C. while cooling. Then, the reaction is completed at 70° to 90° C. over a period of one to three hours. When using methacrylic monomers, it is advantageous to raise the temperature to about 140° C. in this phase. The ring formation using the carbonyl compound is carried out at about 80° to 115° C., the reaction water being removed azeotropically with an entraining agent such as a hydrocarbon solvent with a boiling range of 80° to 120° C.

The epoxy groups of the di- or polyepoxy resins which are not reacted during the introduction of the secondary amines containing the oxazolidine group are reacted with other compounds carrying active hydrogen atoms such as carboxylic acids or amines. The proucts used as binders for electro-deposition are, therefore, practically free from unreacted epoxy groups. Suitable carboxylic acids for use herein are long-chain carboxylic acids, such as saturated or unsaturated oil fatty acids, and also alpha,beta-unsaturated monocarboxylic acids such as (meth)acrylic acid or semiesters of dicarboxylic acids with saturated or unsaturated alcohols or hydroxyalkyloxazolidines or partial esters of tricarboxylic acids. Similar modifications are disclosed in EP No. 00 28 402. Minor quantities of aliphatic dicarboxylic acids may be coemployed whereby the molecular weight can be increased. When primary and secondary amines are used, the range of the total amine value has to be considered, as well as the possibility of influencing the viscosity, since otherwise the parameters for electrodeposition are affected to a more than tolerable extent.

In a particularly favorable embodiment of the present invention the binders prepared according to the invention, after reaction of the epoxy resin with the oxazolidine group containing secondary amine and the other modifying agents, are subjected to an acidic hydrolysis at 50° to 80° C., by which, as is assumed, the oxazolidine rings are partly opened to form substituted methylol groups. Through this post-treatment, reactions otherwise occurring in the finished paint or the paint bath are avoided. For this purpose the reaction product is treated for several hours with water and a portion of the acid later on used for neutralization.

The binders can be milled with pigments in known manner and, for preparing paints ready to use, they are diluted with preferably deionized water, after partial or total neutralization with inorganic or organic acids to a pH-value of from 4 to 7, to a solids content of from 5 to 20% for application by electrodeposition. The binders produced according to the invention have excellent dilutability with water, even with a low degree of neutralization. The use of additives and paint aids as well as the conditions for the coating of a substrate wired as a cathode are known to those skilled in the art and need no further explanation. The products of the invention are particularly suited as mill base for grinding pigments and extenders. The methods are known to those skilled in the art.

The examples hereinafter are to illustrate the invention and are not to limit its scope. All parts or percentages refer to weight unless otherwise stated. All figures in the tables refer to solids.

The following abbreviations are used in the examples:
HMDA: hexamethylenediamine
TCDA: tricyclodecanediamine
IPDA: isophoronediamine
DETA: diethylenetriamine
DEAPA: diethylaminopropylamine
DMAPA: dimethylaminopropylamine
BA: n-butylamine
MEA: monoethanolamine
DEA: diethylamine
AEEA: aminoethylethanolamine
APEA: aminopropylethanolamine
CE: glycidylester of $C_9$–$C_{11}$ monocarboxylic acids
AGE: allylglycidylether
GMA: glycidylmethacrylate
EPH I: epoxy resin on Bisphenol A epoxy equivalent ca. 200
EPH II: epoxy resin on Bisphenol A epoxy equivalent ca. 500
EPH III: epoxy resin on a phenolnovolak, epoxy equivalent ca. 190
BUAC: butylacrylate
EHA: 2-ethylhexylacrylate
EMA: ethylmethacrylate
HEA: hydroxyethylacrylate
HEMA: hydroxyethylmethacrylate
FA: paraformaldehyde (91%)
MIBK: methylisobutylketone
CHX: cyclohexanone
THPA: tetrahydrophthalic anhydride MA: maleic anhydride
TMA: trimellitic anhydride
ACS: acrylic acid
MACS: methacrylic acid
PS: palmitic acid
OS: oleic acid
EGL: ethyleneglycolmonoethylether
HIPOX: N-2-hydroxypropyl-5-methyl-oxazolidine
HETOX: N-2-hydroxyethyloxazolidine
AZ: amine value mg KOH/g
DBZ: number of chain end alpha,beta-unsaturated double bonds per 1000 g of resin solids
NEUTR: neutralization m-mole of acid per 100 g of resin solids
pH: pH-value of a 10% solution with the indicated neutralization
Vmax: rupture voltage (Volt)

The following are preparations of intermediate components:

(A) Preparation Of The Secondary Amines Containing Oxazolidine Groups According To General Formulae (I) And (II)

In a suitable reaction vessel the diamine or triamine is charged and the monoepoxy compound is added within 1 hour at 60° to 120° C. (phase 1); the reaction is completed at 90°-130° C. for 1 to 3 hours (phase 2). After cooling to 70°-80° C., the carbonyl compound and the entraining solvent (hydrocarbon solvent with a boiling range of 80° to 120° C.) is added and the reflux temperature is held until the theoretical quantity of water has distilled off. Then the solvent is vacuum-stripped. If necessary, the reaction product may be diluted with EGL for easier manipulation. Weight ratios and conditions are listed in Table 1.

TABLE 1
PREPARATION OF SECONDARY AMINES HAVING OXAZOLIDINE GROUPS

| Prep. No. | Di(Tri)amine Quantity (g) | Type | Monoepoxy Compound Quantity (g) | Type | Reaction Temperature Temp. Phase 1 (°C.) | Time/Temp. (h/°C.) | Carbonyl Compound Quantity (g) | Type |
|---|---|---|---|---|---|---|---|---|
| A1 | 116 | HMDA | 480 | CE | 80-90 | 3/130 | 33 | FA |
| A2 | 194 | TCDA | 228 | AGE | 70-80 | 2/110 | 100 | MIBK |
| A3 | 170 | IPDA | 240 142 | CE GMA | 60-70 | 3/100 | 100 | MIBK |
| A4 | 103 | DETA | 480 | CE | 75-85 | 3/130 | 66 | FA |
| A5 | 170 | IPDA | 228 | AGE | 70-80 | 2/110 | 98 | CHX |
| A6 | 103 | DETA | 114 142 | AGE GMA | 60-70 | 3/100 | 66 | FA |
| A7 | 116 | HMDA | 240 142 | CE GMA | 80-90 | 3/120 | 100 | MIBK |
| A8 | 194 | TCDA | 480 | CE | 80-90 | 3/130 | 98 | CHX |
| A9 | 103 | DETA | 228 | AGE | 70-80 | 3/110 | 200 | MIBK |
| A10 | 170 | IPDA | 284 | GMA | 60-70 | 3/100 | 33 | FA |
| A11 | 103 | DETA | 114 240 | AGE CE | 70-80 | 3/120 | 66 | FA |
| A12 | 194 | TCDA | 240 142 | CE GMA | 70-80 | 3/110 | 100 | MIBK |
| A13 | 116 | HMDA | 240 142 | CE GMA | 70-80 | 3/110 | 33 | FA |

(B) Preparation Of Secondary Oxazolidine Amines According To General Formula (III)

While cooling to 30° to 35° C., the (meth)acrylic monomer is added within 1 hour to the charged amine and the reaction is completed during 1 to 3 hours at 70° to 90° C. (when using methacrylates at about 140° C.). Then, at 70° to 80° C., the carbonyl compound and the entraining solvent (hydrocarbon solvent with a boiling range of 80° to 120° C.) is added and the reaction is conducted at 80° to 115° C., with azeotropic distillation of the reaction water. Then the solvent is vacuum stripped. Weight ratios and conditions are listed in Table 2.

TABLE 2
PREPARATION OF SECONDARY OXAZOLIDINE AMINES ACCORDING TO GENERAL FORMULA (III)

| Prep. No. | Amine | Acrylic Monomer | Reaction Conditions hours/°C. | Carbonyl Compound |
|---|---|---|---|---|
| C 1 | 104 AEEA | 128 BUAC | 2/70 | 100 MIBK |
| C 2 | 104 AEEA | 184 EHA | 1/70 | 33 FA |
| C 3 | 118 APEA | 114 EMA | 2/140 | 98 CHX |
| C 4 | 104 AEEA | 116 HEA | 1/75 | 33 FA |

(C) Preparation Of Partial Esters (HE) Employed As Or With The Monocarboxylic Acids The reaction of the compositions listed in Table 3 is conducted at the given reaction temperature until the acid value calculated for the semi-ester is reached. Optionally, the reaction is carried out in suitable solvents such as MIBK or diethyleneglycoldimethylether.

TABLE 3
PREPARATION OF PARTIAL ESTERS FOR REACTION WITH EPOXY RESINS MODIFIED WITH OXAZOLIDINE AMINES

| | Carboxylic Anhydride Quantity (g) | Type | Alcohol Quantity (g) | Type | Reaction Temperature °C. |
|---|---|---|---|---|---|
| HE 1 | 152 | THPA | 145 | HIPOX | 70 |
| HE 2 | 98 | MA | 117 | HETOX | 55 |
| HE 3 | 122 38 | THPA TMA | 36 105 | HEMA HIPOX | 70 |
| HE 4 | 152 | THPA | 130 | HEMA | 80 |
| HE 5 | 152 | THPA | 117 | HETOX | 70 |
| HE 6 | 98 | MA | 65 73 | HEMA HIPOX | 60 |

EXAMPLES 1-16

Use Of Secondary Oxazolidine Amines Of Formulae (I) And (II) Binders

The starting materials listed in Table 4 are optionally diluted with EGL to provide a solution at 62–72% by weight solids. The batch is heated to 75° C. and held until the acid value has fallen below 3 mg KOH/g. Upon addition of 10 millimole acetic acid per 100 g of resin solids, the products are diluted with water to a solids content of 60% by weight and held at 50° to 70° C. for 3 hours while stirring. If necessary, the products may be diluted with solvents such as diacetone alcohol or glycol ethers prior to application.

TABLE 4
BINDERS OF INVENTION

| Ex. | Epoxy Resin Quantity (g) | Type | Oxazolidine Amine Quantity (g) | Type | Carboxylic Acid Quantity (g) | Type | Amine Quantity (g) | Type |
|---|---|---|---|---|---|---|---|---|
| 1 | 200 | EPH II | 353 | A 2 | 488 | HE 5 | — | — |
|   | 400 | EPH III |     |     |     |      |   |   |
| 2 | 450 | EPH III | 528 | A 4 | 423 | HE 4 | — | — |
| 3 | 200 | EPH I | 459 | A 13 | 205 | PS | — | — |
|   | 400 | EPH II |    |      | 86  | MACS |  |   |
|   | 170 | EPH III |   |      |     |      |   |   |
| 4 | 600 | EPH II | 385 | A 11 | 297 | HE 1 | — | — |
|   | 250 | EPH III |    |      | 50  | ACS |   |   |
| 5 | 300 | EPH II | 120 | A 1 | 368 | HE 1 | 25 | DEAPA |
|   | 230 | EPH III |    |      |     |      |    |       |
| 6 | 100 | EPH I | 90 | A 11 | 400 | HE 3 | 30 | DEAPA |
|   | 350 | EPH II |   |      |     |      |    |       |
|   | 200 | EPH III |  |      |     |      |    |       |
| 7 | 210 | EPH I | 157 | A 7 | 165 | HE 6 | 31 | DMAPA |
|   | 250 | EPH III |   |      | 58  | ACS |    |       |
| 8 | 400 | EPH III | 158 | A 8 | 258 | HE 2 | 8 | BA |
|   |     |         |     |     | 43  | MACS |   |   |
| 9 | 240 | EPH II | 124 | A 4 | 342 | HE 5 | 25 | DEAPA |
|   | 260 | EPH III |    |     |     |      |    |       |
| 10 | 300 | EPH I | 160 | A 3 | 310 | HE 4 | 39 | DEAPA |
|    | 220 | EPH III |   |     | 180 | PS   |    |       |
| 11 | 300 | EPH I | 93 | A 10 | 238 | HE 1 | 41 | DMAPA |
|    | 250 | EPH II |   |      | 43  | ACS |    |       |
|    | 150 | EPH III |  |      | 36  | MACS |   |       |
| 12 | 200 | EPH I | 74 | A 9 | 367 | HE 4 | 39 | DEAPA |
|    | 200 | EPH III |  |     |     |      |    |       |
| 13 | 500 | EPH II | 77 | A 6 | 129 | HE 2 | 12 | MEA |
|    | 250 | EPH III |   |     | 79  | MACS |   |     |
| 14 | 250 | EPH I | 99 | A 12 | 482 | HE 3 | 7 | BA |
|    | 500 | EPH II |   |      |     |      |   |    |
| 15 | 200 | EPH I | 191 | A 5 | 326 | HE 5 | 20 | DEAPA |
|    | 230 | EPH III |    |     | 85  | OS  |    |       |
| 16 | 200 | EPH I | 628 | A 8 | 226 | HE 4 | 44 | DEA |
|    | 550 | EPH II |    |     |     |      |    |     |

Table 5 lists the characteristics of the products according to Examples 1-16.

Evaluation of the binders produced in Examples 1-16 for water resistance is carried out by coating degreased, untreated steel panels with a clear varnish neutralized with formic acid to the pH-value suited for application. To determine salt spray resistance, the degreased untreated steel panels are coated with a pigmented paint (100 parts resin solids, 16 parts Al-silicate pigment, 2 parts carbon black, 2 parts lead silicate), at optimum voltage conditions, giving coats with a dry film thickness of 16-20 μm and cured for 30 minutes at 160° C. Evaluation of water resistance after 380 hours (water soak at 40° C.) shows no visible changes through rusting or blistering. In the salt spray test according to ASTM B 117-64, all coatings, after 340 hours, show rust of less than 2 mm at the cross-incision (Scotch tape test).

TABLE 5
EVALUATION OF BINDERS OF EXAMPLES

| Example | AZ | DBZ | NEUTR | pH | Vmax |
|---|---|---|---|---|---|
| 1 | 125 | — | 40 | 6.8 | 180 |
| 2 | 104 | 1.07 | 40 | 6.8 | 230 |
| 3 | 66 | 1.25 | 65 | 6.2 | 170 |
| 4 | 120 | 0.44 | 45 | 6.6 | 210 |
| 5 | 108 | — | 20 | 7.0 | 300 |
| 6 | 95 | 0.32 | 25 | 6.8 | 290 |
| 7 | 102 | 1.63 | 50 | 6.5 | 140 |
| 8 | 119 | 0.58 | 30 | 6.7 | 190 |
| 9 | 128 | — | 20 | 7.3 | 300 |
| 10 | 51 | 1.12 | 60 | 6.0 | 230 |
| 11 | 97 | 1.22 | 45 | 6.3 | 240 |
| 12 | 67 | 1.48 | 55 | 5.9 | 270 |
| 13 | 75 | 1.19 | 50 | 6.1 | 250 |
| 14 | 69 | 0.44 | 60 | 6.4 | 200 |
| 15 | 123 | — | 35 | 7.2 | 260 |
| 16 | 72 | 0.52 | 50 | 6.9 | 240 |

EXAMPLES 17-21

Use Of Secondary Oxazolidine Amines Of Formula (III) In Binders

The starting materials listed in Table 6 are optionally dissolved in EGL to give a solution at 62 to 72% solids content. The batch is heated to 75° C. and held at this temperature until the acid value has fallen to below 3 mg KOH/g. Upon addition of 10 millimole acetic acid per 100 g of resin solids and dilution with water to a solids content of 60% by weight, the batch is held at 50°-70° C. for about 3 hours. If necessary, the binders may be diluted with solvents such as diacetone alcohol or glycol ethers prior to further processing.

TABLE 6
PAINT BINDERS UTILIZING SECONDARY OXAZOLIDINE AMINES OF FORMULA (III)

| Example | Epoxy Resin | Oxazolidine Amine | Carboxylic Acid | Modifiers Amine |
|---|---|---|---|---|
| 17 | 300 EPH I<br>500 EPH II | 251 C 1 | 226 HE 4 | 22 DEA<br>39 DEAPA |
| 18 | 200 EPH I<br>342 EPH III | 150 C 2 | 505 HE 1 | 32 DMAPA |
| 19 | 400 EPH II<br>304 EPH III | 530 C 3 | 69 MACS | — |
| 20 | 200 EPH I<br>500 EPH II<br>190 EPH III | 232 C 4 | 236 HE 6 | 44 DEA<br>21 DMAPA |
| 21 | 456 EPH III | 240 C 2 | 338 HE 4 | 29 DEA |

Table 7 lists the characteristics of the products of Examples 17–21. The evaluation of the binders is carried out analogous to Examples 1–16. Also these products, after 380 hours of water resistance test (water soak at 40° C.) show no visible changes through rusting or blistering. In the salt spray test according to ASTM B 117-64, all coatings show rusting of less than 2 mm at the cross-incision after 340 hours (Scotch tape test).

TABLE 7
EVALUATION OF BINDERS OF TABLE 6

| Example | AZ | DBZ | NEUTR | pH | Vmax |
|---|---|---|---|---|---|
| 17 | 105 | 0.6 | 30 | 6.8 | 290 |
| 18 | 150 | — | 20 | 7.1 | 300 |
| 19 | 146 | 0.6 | 25 | 6.7 | 270 |
| 20 | 138 | 0.35 | 35 | 6.6 | 280 |
| 21 | 105 | — | 45 | 6.3 | 200 |

As will be apparent to one skilled in the art, various modifications can be made within the scope of the aforesaid description. Such modifications being within the ability of one skilled in the art form a part of the present invention and are embraced by the appended claims.

It is claimed:

1. Paint binders, water-soluble upon total or partial neutralization with inorganic and/or organic acids, which are the reaction products of a compound having at least two 1,2-epoxy groups per molecule with a secondary amine of the general formula $$R_3-CH-CH-NH-R_1-N-CH-R_4;\quad (I)$$
(with OH on second CH; R_2, R_2, C, O, CH–R_3 forming oxazolidine ring)

or $$R_4-CH-N-(CH_2)_n-NH-X;\quad (II)$$
(R_3–CH, O, C, R_2, R_2 forming oxazolidine ring)

or $$R_5-NH-R_1-N-CH-R_4\quad (III)$$
(R_2, R_2, C, O, CH–R_6 forming oxazolidine ring)

and mixtures thereof, wherein $R_1$ is a straight chain or branched chain or cyclic alkylene radical with from 2 to 12 C-atoms or an aralkylene radical, $R_2$ is a straight chain or branched chain alkyl radical with from 1 to 4 C-atoms or an aryl group or a hydrogen atom, or both $R_2$ groups jointly are ring-forming alkylene radicals optionally substituted with alkyl, aryl, or alkoxy radicals, $R_3$ is a saturated or unsaturated aliphatic or cycloaliphatic or aromatic hydrocarbon radical, optionally carrying ether or ester linkages, $R_4$ is H or $CH_3$—, n is 2–4, X is either $$-(CH_2)_n-N\begin{array}{c}R_4\\|\\-CH-R_4\end{array}\text{ or }-(CH_2)_n-NH-CH-CH-R_3$$
(with OH, and oxazolidine ring with $R_2$, $R_2$, C, O, CH–$R_3$)

$R_5$ is a radical after reaction with an active hydrogen atom of an acrylic or methacrylic monomer, monofunctional with regard to the double bond, and $R_6$ is a hydrogen atom or an alkyl radical, and with a saturated and/or unsaturated carboxylic acid, the quantity of basic compounds being chosen in order that the end product has a theoretical amine value of at least 35 mg KOH/g.

2. The paint binders of claim 1 wherein said amine value is from 50 to 140 mg KOH/g.

3. The paint binders of claim 1 wherein said compound containing epoxy groups, in addition to reaction with said amines of formula (I), (II) and (III) and said acids has been optionally also reacted with an amine selected from the group consisting of primary and secondary amines and alkanol amines.

4. The paint binders of claim 1 wherein the compounds having at least two 1,2-epoxy groups are the reaction products of epichlorohydrin with a diphenol or a phenol novolak, said compound having an epoxy equivalent weight of between about 170 and 1000.

5. The paint binders of claim 1 wherein said carboxylic acid is at least in part a semiester of a dicarboxylic acid with saturated or unsaturated monoalcohols or with hydroxyalkyl oxazolidines or the corresponding partial ester of tricarboxylic acids.

6. The paint binders of claim 1 wherein the reaction products are subjected to acid hydrolysis at from 50° to 80° C.

7. Process of producing paint binders, water-soluble upon total or partial neutralization with inorganic and/or organic acids, by reacting a compound having at least two 1,2-epoxy groups per molecule with a secondary amine of the general formula $$R_3-CH-CH-NH-R_1-N-CH-R_4;\quad (I)$$
(with OH; oxazolidine ring with $R_2$, $R_2$, C, O, CH–$R_3$)

or

-continued

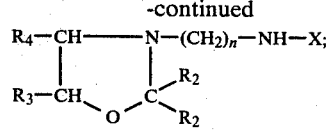

or

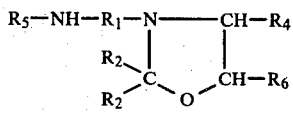

and mixtures thereof
wherein
R₁ is a straight chain or branched chain or cyclic alkylene radical with from 2 to 12 C-atoms or an aralkylene radical,
R₂ is a straight chain or branched chain alkyl radical with from 1 to 4 C-atoms or an aryl group or a hydrogen atom, or both R₂ groups jointly are ring-forming alkylene radicals optionally substituted with alkyl, aryl, or alkoxy radicals,
R₃ is a saturated or unsaturated aliphatic or cycloaliphatic or aromatic hydrocarbon radical, optionally carrying ether or ester linkages,
R₄ is H or CH₃—,
n is 2–4,
X is either

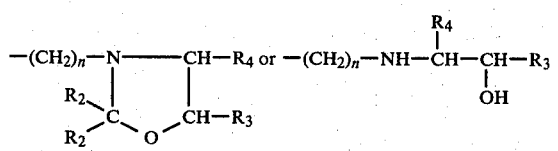

R₅ is a radical after reaction with an active hydrogen atom of an acrylic or methacrylic monomer, monofunctional with regard to the double bond, and
R₆ is a hydrogen atom or an alkyl radical;
and with a saturated or unsaturated carboxylic acid, said reaction being carried out in the presence of inert solvents at from 60° to 80° C., and the quantity of basic compounds being maintained in order that the end product has a theoretical amine value of at least 35 mg KOH/g.

8. The process of claim 7 wherein said epoxy compound is also reacted with an amine selected from the group consisting of a primary and secondary alkyl amine and alkanol amine.

9. The process of claim 7 wherein said theoretical amine value is from about 50 to 140 mg KOH/g.

10. The process of claim 7 wherein said epoxy compound having at least two 1,2-epoxy groups are the reaction products of epichlorohydrin with a diphenol or a phenol novolak, said compound having an epoxy equivalent weight of between about 170 and 1000.

11. The process of claim 7 wherein said saturated or unsaturated carboxylic acid is at least in part a semiester of a dicarboxylic acid with saturated or unsaturated monoalcohols or with hydroxyalkyl oxazolidines or the corresponding partial esters of tricarboxylic acids.

12. The process of claim 7 wherein said process further includes subjecting the final product to acidic hydrolysis at from 50° to 80° C.

13. The reaction product of a compound having at least two 1,2-epoxy groups per molecule with a secondary amine of the general formula

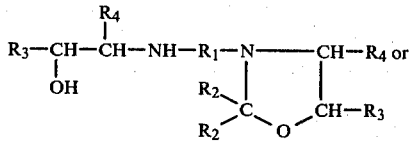

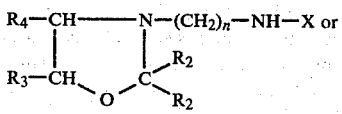

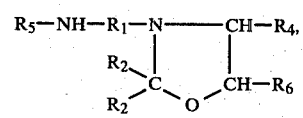

and mixtures thereof
wherein
R₁ is a straight chain or branched chain or cyclic alkylene radical with from 2 to 12 C-atoms or an aralkylene radical,
R₂ is a straight chain or branched chain alkyl radical with from 1 to 4 C-atoms or an aryl group or a hydrogen atom, or both R₂ groups jointly are ring-forming alkylene radicals optionally substituted with alkyl, aryl, or alkoxy radicals,
R₃ is a saturated or unsaturated aliphatic or cycloaliphatic or aromatic hydrocarbon radical, optionally carrying ether or ester linkages,
R₄ is H or CH₃—,
n is 2–4,
X is either

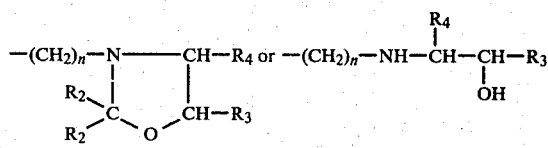

R₅ is a radical after reaction with an active hydrogen atom of an acrylic or methacrylic monomer, monofunctional with regard to the double bond, and
R₆ is a hydrogen atom or an alkyl radical.

14. The reaction products of claim 13 wherein said theoretical amine value is at least 35 mg KOH/g.

* * * * *